United States Patent

Jackson

Patent Number: 6,017,016
Date of Patent: Jan. 25, 2000

[54] FLAPPER VALVE

[75] Inventor: Phillip Richard Jackson, Dorset, United Kingdom

[73] Assignee: Flight Refueling Limited, Dorset, United Kingdom

[21] Appl. No.: 09/199,438

[22] Filed: Nov. 25, 1998

Related U.S. Application Data

[63] Continuation of application No. PCT/GB97/01452, May 28, 1997.

[30] Foreign Application Priority Data

May 29, 1996 [GB] United Kingdom .................... 9611147

[51] Int. Cl.[7] .................................................. F16K 31/02
[52] U.S. Cl. ....................................... 251/129.06; 251/357
[58] Field of Search .................. 251/129.06, 129.01, 251/333, 334, 359, 364, 357

[56] References Cited

FOREIGN PATENT DOCUMENTS

| 0 036 187 | 9/1981 | European Pat. Off. . |
|---|---|---|
| 36 08 550 | 9/1987 | Germany . |
| 322 989 | 4/1970 | Sweden . |
| 2 134 223 | 8/1984 | United Kingdom . |
| 2 137 776 | 10/1984 | United Kingdom . |
| 2 181 278 | 4/1987 | United Kingdom . |
| WO 80/01826 | 9/1980 | WIPO . |
| WO 86/07429 | 12/1986 | WIPO . |

OTHER PUBLICATIONS

V.N. Garnov et al., "High–speed Pulsed Valve Based on a Bimorph Piezoelectric Element", Instruments and Experimental Techniques, vol. 23, No. 4, pp. 981–983 (1980).

M. Takenobu, Patent Abstracts of Japan of JP 63 190985, "Normal Open Type Piezoelectric Valve and Driving Method Thereof", (Aug. 8, 1988), (Abstract Only).

*Primary Examiner*—Kevin Lee
*Attorney, Agent, or Firm*—Finnegan, Henderson, Farabow, Garrett & Dunner, L.L.P.

[57] ABSTRACT

A bimorph piezoelectric flapper element is mounted at one end in a valve casing so that it extends into a valve chamber as a cantilever. The flapper element tapers to the unsupported end on which a fluorosilicone blocking plate is mounted. An outlet port is formed by a tubular boss which projects into the valve chamber and which tapers to a fine annular rim formed around a mouth of a bore at the tip of the boss. The blocking plate is normally held by the flapper element seated on the tip of the tubular boss to close the outlet port, the tip making an indentation in the fluorosilicone whereby to form a 'bite' seal. The blocking plate is unseated by the application of a low voltage to the bimorph piezoelectric element. The valve is suitable for hydraulic fluids and may be operated by optical power.

14 Claims, 2 Drawing Sheets

FLAPPER VALVE

This application is a continuation of International Application No. PCT/GB97/01452, filed May 28, 1997, the content of which is incorporated herein by reference.

BACKGROUND OF THE INVENTION

This invention relates to a flapper valve comprising a valve chamber with an outlet orifice and a piezoelectric flapper element which is mounted by one end in structure of the valve chamber in the manner of a cantilever so that it extends into the valve chamber, the flapper element being operable to bend and interact with fluid flow through a nozzle which is formed in a wall of the valve chamber whereby to modulate fluid flow through that nozzle when an electrical potential is applied to it.

SE-A-322989, WO80/01826, GB-A-2137776, GB-A-2181278 and DE-A-3608550 each disclose the use of a tongue-shaped piezoelectric element to regulate air or gas pressure in a line by controlling airflow from the line through a nozzle. The piezoelectric element is supported at one end in the manner of a cantilever and has its other end co-operating with the nozzle. The element is caused or allowed to bend laterally by the application of an electrical potential to it so that part of it moves towards or away from the nozzle whereby flow of air through the nozzle is modulated, that is to say the flow through the nozzle is regulated by the proximity of the free end of the flapper element to the nozzle.

GB-A-2137776 describes the piezoelectric element as consisting of a piece of thin brass conductive strip sandwiched between two layers of ceramic material, one of which is caused to expand and the other to contract when an electrical potential is applied across the layers. Such elements are known as bimorph piezoelectric elements, or flappers.

Whereas SE-A-322989, WO80/018216 and GB-A-2137776 only describe the use of a flapper to modulate or regulate airflow through a nozzle and thereby to control pressure in a line leading to a nozzle, each of GB-A-2181278 and DE-A-3608550 describes the use of such a bimorph flapper to close or open a port with which it co-operates. The flapper disclosed by GB-A-2181278 closes the port by seating at the downstream end of the port. DE-A-3608550 discloses a three-way valve having two such flapper elements, one of which closes one of the ports at its downstream end so that the other two ports are connected, and the other of which closes one of the other two ports at its upstream end whilst the first mentioned flapper element is unseated so that the port with which it cooperates is connected to the third port. GB-A-2137776 describes the flapper as being trapezoidal in form, the shorter of the two parallel sides being at its free end.

The use of such a bimorph flapper to close the port by seating at the upstream end of the port is disclosed in an article entitled "High-Speed Pulsed Valve Based on a Bimorph Piezoelectric Element" by V. N. Garnov et al and published in "Instruments and Experimental Techniques" Vol. 23 (1980) July–August No. 4, Part 2, New York, U.S.A. The upstream end of the port is formed in a flat surface at the end of a tubular boss which projects into the valve chamber. The flapper carries a rubber sealing gasket which seats on the flat surface and which is compressed by deflection of the flapper when so seated to make the seal. The seal is a face seal, the gasket and the flat surface having substantially the same circumference and diameter. It has been found that this valve is not a truly, normally-closed valve. To the contrary, there is leakage due to a continual opening and shutting of the valve which is accompanied by a blowing-off noise like that made by air escaping from a toy balloon when the latter is released. Such repetitive opening and closing of the valve can lead to resonance of the flapper which can induce catastrophic high voltages which will reduce the lifetime of the flapper and/or the drive electronics. DE-A-3608550 discloses the provision of a flexible sealing disc at the free end of each of its flapper elements, the sealing disc being caused to fit tightly against a valve seat formed at the end of the respective port and having a larger area than that valve seat which comprises a flat surface which is formed around the mouth of the outlet and which in turn is surrounded by a conically bevelled semi-spherical or other profiled surface. The seal is shown as a face seal between the sealing disc and the flat valve seat.

Limitations of such previously known bimorph piezoelectric flapper valves have been the power requirements, the order of actuation force required and the distances through which the free end of the flapper element needs to be moved as well as high hysteresis and limited stiffness of the flapper elements.

SUMMARY OF THE INVENTION

An object of this invention is to provide a form of flapper valve which may be operated by lower input power and which does not suffer from the above described shortcomings of the Garnov et al proposal, which may be used for controlling hydraulic fluids and which may be a true normally closed valve for hydraulic fluids.

According to this invention there is provided a normally closed flapper valve comprising a valve chamber with an outlet and a piezoelectric element which is mounted by one end in structure of the valve chamber in the manner of a cantilever so that it extends into the valve chamber, the flapper element being operable to bend and to interact with fluid flow through a nozzle which is formed in a wall of the valve chamber and which forms the outlet whereby to modulate fluid flow through that nozzle when an electrical potential is applied to it, in which the flapper element carries a blocking plate of a resiliently deformable material which is adapted to be seated by bending of the flapper element, on a tubular boss which projects into the valve chamber and forms the upstream end of the outlet nozzle, whereby to shut-off fluid flow from within the valve chamber through the outlet nozzle wherein the area of the surface of the blocking plate that seats upon the tubular boss is substantially greater than the sum of the area of the mouth of the outlet nozzle and of the area of an end surface of the tubular boss that surrounds that mouth, the resiliently deformable material being chosen such that the tubular boss makes an indentation in the resiliently deformable material of the blocking plate when the latter is seated on the tubular boss and the material of the blocking plate thereby closely conforms to part of the side of the tubular boss around that end surface whereby the tubular boss and the resiliently deformable material of the blocking plate interact to form a repeatable 'bite' seal when the blocking plate is seated.

Preferably the outlet nozzle serves as a Venturi nozzle for fluid flow through it from within the valve chamber whereby to cause a suction force between the blocking plate and the nozzle which urges the flapper element to its closed position where the blocking plate is seated on the tubular boss.

The preferred form of tubular boss has an outer surface which tapers to a fine tip at the upstream end of the outlet nozzle.

Preferably the flapper element comprises a bimorph piezoelectric element.

In a preferred embodiment of this invention, the width of the flapper element is reduced away from its one end. More particularly, the preferred form of flapper element is triangular so that the bending stress per unit area of it is constant for any point along the whole length of it. The flapper element conveniently tapers to a tip at which the blocking plate is carried.

A drive circuit for the flapper valve conveniently comprises means for generating a square wave which are connected across one winding of voltage transformer means, and rectifier means connected across the other winding of the voltage transformer means and across the bimorph piezoelectric flapper element in parallel with variable resistance means.

BRIEF DESCRIPTION OF THE DRAWINGS

A normally closed flapper valve for hydraulic applications is described now by way of example with reference to the accompanying drawings, of which.

DETAILED DESCRIPTION OF THE PREFERRED EMBODIMENT

Figure 1:
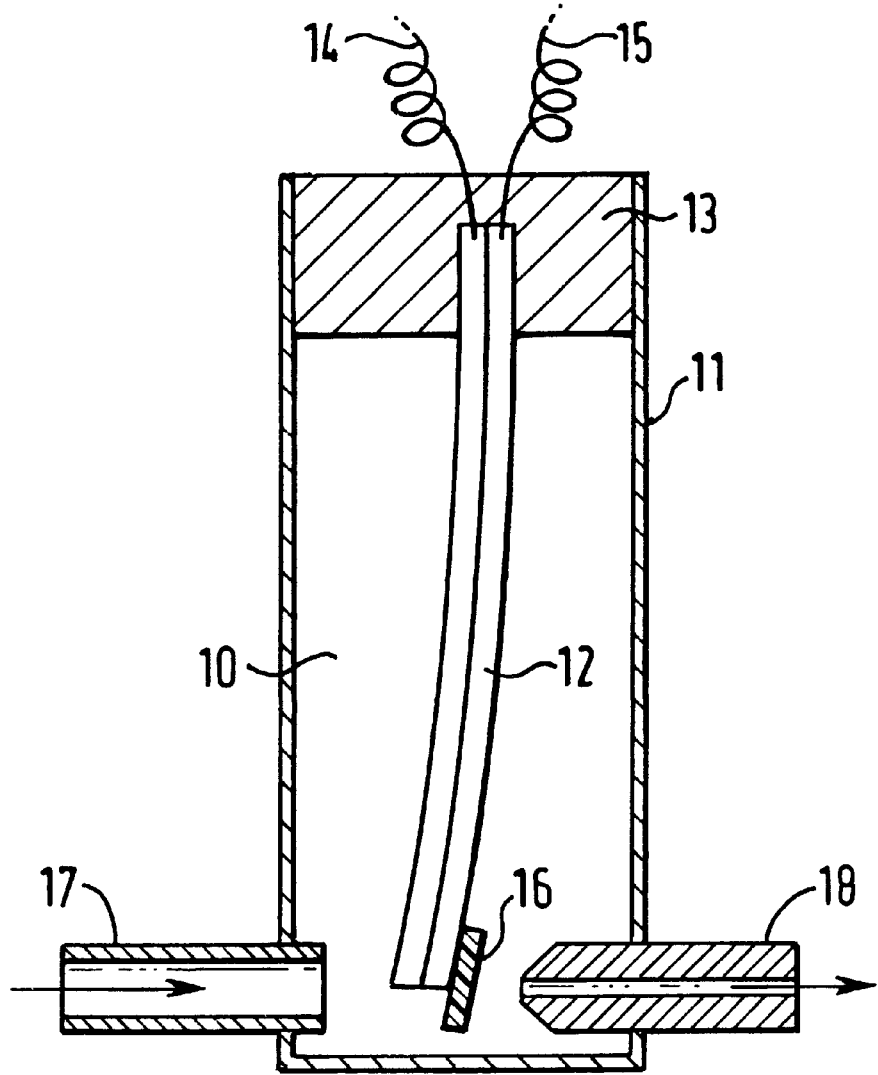
FIG. 1 is a diagrammatic illustration of the flapper valve with the flapper element deflected so that the outlet port is open.

FIG. 1 shows the flapper valve comprises a valve chamber 10 formed within a valve casing 11. A bimorph piezoelectric flapper element 12 is mounted by one end in an end wall 13 of the casing 11 in the manner of a cantilever so that it extends into the valve chamber 10. The two plate portions of the bimorph piezoelectric element 12 are connected respectively by leads 14 and 15 to terminals outside the valve casing 11 by which the valve is connected into a drive circuit which is described below with reference to FIG. 3.

Figure 2:
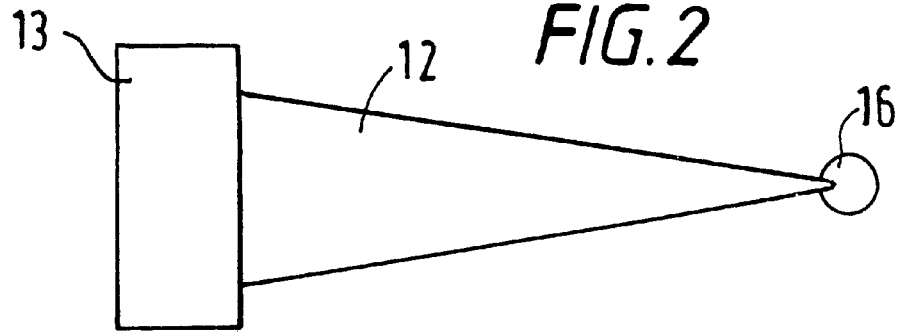
FIG. 2 is a fragmentary view on arrow A in FIG. 1 of the flapper valve element.

FIG. 2 shows the flapper element 12 tapers from the end wall 13 to its other end on which is mounted a blocking plate 16 of an elastomeric material such as fluorosilicone.

FIG. 1 shows the blocking plate 16 is located between a tubular inlet port 17 and a tubular outlet port 18, the two ports 17 and 18 being mounted in opposite walls of the casing 11. A portion of the tubular outlet port 18 projects into the valve chamber 10 and has a frusto-conical surface which surrounds and tapers towards the upstream end of the bore of the tubular outlet port 18 where a fine annular rim is formed around the mouth of the bore of the tubular outlet port 18 at the tip of the frusto-conical surface. The bore of the tubular outlet port 18 is restricted in dimensions compared to the bore of the inlet 17 so that the outlet port 18 serves as a Venturi nozzle for flow of hydraulic fluid out from the valve chamber 10 through it. In one embodiment, the diameter of the bore of the tubular outlet port is 0.5 mm, the outside diameter of the annular rim around its mouth is 0.55 mm and the angle of taper of the frusto-conical surface is 45° to the axis of the bore.

Figure 4:
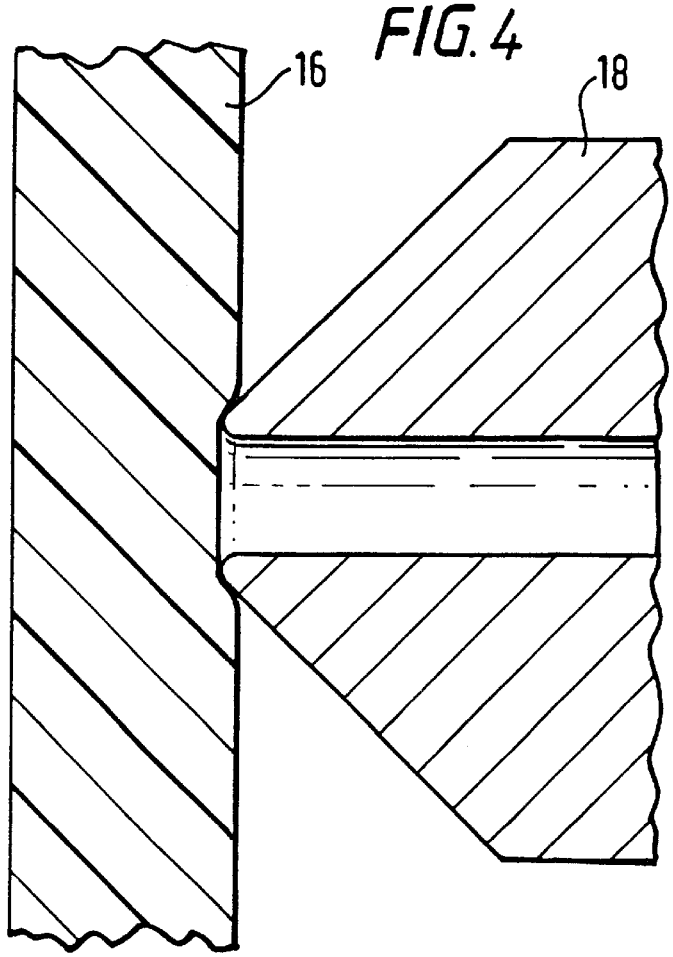
FIG. 4 is a sectioned fragment of the flapper valve shown in FIG. 1 illustrating the formation of a 'bite' seal when the outlet port is closed.

The blocking plate 16 has a diameter several times greater than that of the annular rim that surrounds the bore of the outlet port 18. It is adapted to seat on the adjacent end of the tubular outlet port 18, that is to say the upstream end of the outlet port 18 so as to enable a repeatable 'bite' seal to be made between the Venturi nozzle and the blocking plate 16. FIG. 4 illustrates this 'bite' seal by showing that the fine tip of the tubular outlet port 18 has made an indentation or bite in the elastomeric material of the blocking plate 16 which in turn closely conforms to the external surface of that fine tip.

FIG. 1 shows the valve with the blocking plate 16 displaced from the outlet port 18 so that the outlet port 18 is open for flow of hydraulic fluid from within the valve chamber 10. However the valve is a normally-closed valve, the normal condition of the bimorph piezoelectric element 12 being that which holds the blocking plate 16 seated on the adjacent end of the tubular outlet port 18 as shown in FIG. 4.

The dimensions of the flapper element 12 are chosen so that the bending stresses per unit area are constant for any point along the length of the flapper element 12. The bending moment per unit area has a linear characteristic and thus defines the shape of the flapper element 12 as a triangle. The end portion of the flapper element 12 on which the blocking plate 16 is bonded has a minimum width sufficient for the blocking plate 16 to be mounted on it.

Figure 3:
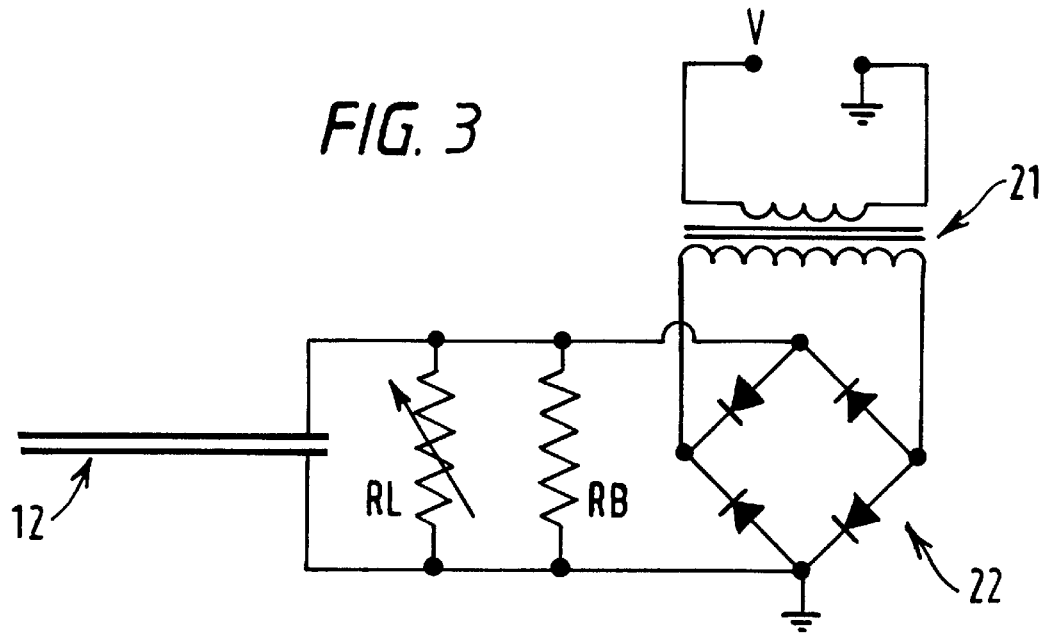
FIG. 3 is a circuit diagram of a drive circuit for the flapper valve.

FIG. 3 shows the drive circuit for applying the operating electrical potential to the plates of the bimorph piezoelectric flapper element 12. A pulse-width modulated square wave electrical potential v is applied across the primary windings of two audio transformers 21. The output of the audio transformers 21, which is taken from the secondary windings, is rectified by a zener diode bridge circuit 22 and the rectified output thereof is applied across the plates of the flapper element 12 in parallel with a variable resistance Rl. As a result the capacitive load of the bimorph piezoelectric element 12 is charged, typically to a maximum of +110V over a period of 120 millisecs at 5.2 milliamps. The variable resistance Rl is provided to counter the fact that the charge on the piezoelectric element 12 leaks across so that the valve would close without it.

In operation of the flapper valve, the flow of hydraulic fluid from the inlet port 17 through the valve chamber 10 and out through the outlet port 18 is controlled. The valve is normally closed, the blocking plate 16 being held seated on the outlet port 18 by the action of the bimorph piezoelectric flapper element 12 so that the valve is suitable for use where loss of fluid to drain is prohibited. The bite seal illustrated in FIG. 4 leads to any tendency for liquid in the valve chamber 10 to unseat the blocking plate 16 and leak through the outlet port 18 being countered because of the close conformity of the material of the blocking plate 10 around the tip of the outlet nozzle which inhibits that liquid from acting on it to unseat it.

To open the valve, the rectified output of the audio transformers 21 is applied to the terminals of the flapper valve, and thus via the leads 14 and 15, to the plates of the flapper valve element 12. This causes the flapper valve element 12 to bend and displace the blocking plate 16 from the outlet port 18 as shown in FIG. 1. The Venturi effect of hydraulic fluid flow through the Venturi nozzle formed by the outlet port 18, causes a suction force between the blocking plate 16 and the nozzle proportional to the distance between the nozzle and the blocking plate 16. The suction force is also effected by the flow rate and the pressure gradient across the interface between the faces of the blocking plate 16 and the nozzle. The applied electrical potential is increased once the valve has been opened in order to counter the suction force and keep the valve open.

The suction due to the Venturi effect urges the flapper element 12 to its closed position where the blocking plate 16 is seated. This improves the operation of the valve as a normally-closed valve since this suction augments the effect of the stiffness of the flapper element 12 which tends to oppose displacement away from the outlet port 18 and which also tends to urge the flapper element to its closed position. The hysteresis loop of the bimorph piezoelectric ceramic material has been counteracted by the Venturi effect suction, thus reducing the operating hysteresis loop of the valve in operation.

The valve is a low-powered electro-hydraulic valve. The design of the bimorph piezoelectric flapper element 12 has been dynamically and statically optimised, which combined with the bimorph ceramic material has enabled lower drive voltages than previously used with pneumatic bimorph valves. This leads to the possibility of using optical-power for a hybrid hydraulic or pneumatic bimorph valve. The resultant valve has the advantages of fast response, high efficiency, high flow-rates, extended fatigue life, greater reliability and temperature stability with reduced manufacturing costs. This valve has lower power requirements than known pneumatic bimorph valves due to the nozzle-to-blocking plate configuration, the material and by optimisation of the shape of the bimorph flapper element. Impedance matching also reduces the overall electrical power requirements of the system (eg. by power factor correction methods).

The use of pulse-width modulation to linearise the otherwise non-linear characteristics of the bimorph material with improved displacement and force characteristics has enabled the development of the low power hydraulic valve. The preferred bimorph material used is PZT-5k supplied by Morgan-Matroc Ltd. of Wrexham, Clwyd, Wales.

The tapered shape of the bimorph flapper valve has also increased the fundamental resonant frequency of the valve by about 50% as compared with a rectangular flapper element. It has led to a reduction in the effects of drag and viscous damping because of the reduction in the effective area. The static and dynamic characteristics of the valve have been optimised by this shape. The response speed of the valve and the power requirements have also been improved by this shape. This is due to a reduced effective end tip mass and lower distributed mass along the length of the flapper element. The improvements are also due to the decreased charge required for a specific voltage per unit area. Hence, the amount of charge that is required to reach a certain operating voltage and produce actuation is reduced by almost half. Also the amount of material required is minimised.

The forces required to open the valve become larger with an increase in the outlet port nozzle diameter and/or blocking plate area. The Venturi hysteresis loop is increased or decreased by varying the nozzle and blocking plate shapes and sizes. Therefore the hysteresis effects of the overall valve can be tuned by selection of the piezoelectric ceramic material and then be counteracted by the nozzle and blocking plate topographies. The hysteresis associated with the Venturi effect is in an opposite sense to the hysteresis loop associated with the piezoelectric bimorph ceramic material, enabling the valve to be operated with proportional control from a fully closed position.

Variation of Rl allows fine tuning of the shut-off response of the valve. The response speed for opening does not significantly vary with Rl. However, the amount of power required to open the valve increases with a reduction in Rl. The drive frequency is matched to the valve circuit, such that the power requirements can be reduced further. The shut-off delay when power is removed from the valve is also increased in proportion with an increase in Rl, the compromise between power requirements and smooth shut-off speed being tailored to requirements. For proportional control, change in applied voltage is proportional to the consequent change in force exerted on the flapper element.

The flapper element can be bent by the application to it of an electrical potential to such an extent that the effect on it of suction due to outflow through the outlet nozzle will cease to be effective in urging it to its closed position whereas the flow of fluid in the valve chamber to the outlet nozzle will act on the flapper element to inhibit movement of it to its closed position. Hence, even though the flapper element can return to its closed position due to its own stiffness, when the applied electrical potential is switched off, its response time will be lengthened. Also, bending of the flapper element to such an extent that it is beyond the influence of the suction due to outflow through the outlet nozzle can lead to the flapper element resonating which can be undesirable since it would induce resonance in the drive circuit. For this reason, care is usually taken to limit the amount by which the tip of the flapper element is displaced from the outlet nozzle by the application of an electrical potential to the flapper element.

I claim:

1. A normally closed flapper valve in combination with a valve casing defining a valve chamber with an outlet nozzle extending from the valve chamber to outside of the valve casing and having an upstream end formed by a tubular boss extending into the valve chamber, and a piezoelectric flapper element mounted at one end in the valve casing as a cantilever extending into the valve chamber, the flapper element being operable to bend and to interact with fluid flow through the outlet nozzle to modulate fluid flow through the nozzle when an electrical potential is applied to the flapper element, wherein the flapper element carries a blocking plate of a resiliently deformable material normally seated by the flapper element on the tubular bossy thereby to normally shut off fluid flow from within the valve chamber through the outlet nozzle, wherein a surface of the blocking plate that seats upon the tubular boss has an area substantially greater than a total area at the upstream end of the outlet nozzle defined by an area of a mouth of the outlet nozzle and an area of an end surface of the tubular boss that surrounds the mouth, the resiliently deformable material being such that when the blocking plate is seated on the tubular boss, the tubular boss makes an indentation in the resiliently deformable material and the material of the blocking plate thereby closely conforms around the end surface of the tubular boss, whereby the tubular boss and the resiliently deformable material of the blocking plate interact to form a repeatable "bite" seal when the blocking plate is seated.

2. A normally closed flapper valve according to claim 1, wherein the outlet nozzle serves as a venturi nozzle for fluid flow through the nozzle from within the valve chamber, thereby to cause a suction force between the blocking plate and the nozzle that urges the flapper element to its closed position as the blocking plate is seated on the tubular boss.

3. A normally closed flapper valve according to claim 1, wherein the tubular boss has an outer surface which tapers to a fine tip at the upstream end of the outlet nozzle.

4. A normally closed flapper valve according to claim 1, wherein the flapper element comprises a bimorph piezoelectric element.

5. A normally closed flapper valve according to claim 2, wherein the tubular boss has an outer surface which tapers to a fine tip at the upstream end of the outlet nozzle.

6. A normally closed flapper valve in combination with a valve casing defining a valve chamber with an outlet nozzle extending from the valve chamber to outside of the valve casing and having an upstream end formed by a tubular boss extending into the valve chamber, and a piezoelectric flapper element mounted at one end in the valve casing as a cantilever extending into the valve chamber, the flapper element being operable to bend and to interact with fluid flow through the outlet nozzle to modulate fluid flow through the element carries a blocking plate of a resiliently deformable material adapted, upon bending of the flapper element, to be seated on the tubular boss, thereby to shut off fluid flow from within the valve chamber through the outlet nozzle, wherein a surface of the blocking plate that seats upon the tubular boss has an area substantially greater than a total area at the upstream end of the outlet nozzle defined by an area of a mouth of the outlet nozzle and an area of an end surface of the tubular boss that surrounds the mouth, the resiliently deformable material being such that when the blocking plate is seated on the tubular boss, the tubular boss makes an indentation in the resiliently deformable material and the material of the blocking plate thereby closely conforms around the end surface of the tubular boss, whereby the tubular boss and the resiliently deformable material of the blocking plate interact to form a repeatable "bite" seal when the blocking plate is seated, and wherein the width of the flapper element is reduced away from the one end thereof.

7. A normally closed flapper valve according to claim 6, wherein the flapper element is triangular so that bending stress per unit area is constant for any point along the whole length of the flapper element.

8. A normally closed flapper valve according to claim 7, wherein the flapper element tapers to a tip at which said blocking plate is carried.

9. A normally closed flapper valve in combination with a valve casing defining a valve chamber with an outlet nozzle extending from the valve chamber to outside of the valve casing and having an upstream end formed by a tubular boss extending into the valve chamber, and a bimorph piezoelectric flapper element mounted at one end in the valve casing as a cantilever extending into the valve chamber, the flapper element being operable to bend and to interact with fluid flow through the outlet nozzle to modulate fluid flow through the nozzle when an electrical potential is applied to the flapper element, wherein the flapper element carries a blocking plate of a resiliently deformable material adapted, upon bending of the flapper element, to be seated on the tubular boss, thereby to shut off fluid flow from within the valve chamber through the outlet nozzle, wherein a surface of the blocking plate that seats upon the tubular boss has an area substantially greater than a total area at the upstream end of the outlet nozzle defined by an area of a mouth of the outlet nozzle and an area of an end surface of the tubular boss that surrounds the mouth, the resiliently deformable material being such that when the blocking plate is seated on the tubular boss, the tubular boss makes an indentation in the resiliently deformable material and the material of the blocking plate thereby closely conforms around the end surface of the tubular boss, whereby the tubular boss and the resiliently deformable material of the blocking plate interact to form a repeatable "bite" seal when the blocking plate is seated, and including a drive circuit comprising means for generating a square wave connected across one winding of voltage transformer means, and rectifier means connected across the other winding of the voltage transformer means and across the bimorph piezoelectric flapper element in parallel with variable resistance means.

10. A normally closed flapper valve in combination with a valve casing defining a valve chamber with an outlet nozzle extending from the valve chamber to outside of the valve casing and having an upstream end formed by a tubular boss extending into the valve chamber, and a piezoelectric flapper element mounted at one end in the valve casing as a cantilever extending into the valve chamber, the flapper element being operable to bend and to interact with fluid flow through the outlet nozzle to modulate fluid flow through the nozzle when an electrical potential is applied to the flapper element, wherein the flapper element carries a blocking plate of a resiliently deformable material adapted, upon bending of the flapper element, to be seated on the tubular boss, thereby to shut off fluid flow from within the valve chamber through the outlet nozzle, wherein a surface of the blocking plate that seats upon the tubular boss has an area substantially greater than a total area at the upstream end of the outlet nozzle defined by an area of a mouth of the outlet nozzle and an area of an end surface of the tubular boss that surrounds the mouth, the resiliently deformable material being such that when the blocking plate is seated on the tubular boss, the tubular boss makes an indentation in the resiliently deformable material and the material of the blocking plate thereby closely conforms around the end surface of the tubular boss, whereby the tubular boss and the resiliently deformable material of the blocking plate interact to form a repeatable "bite" seal when the blocking plate is seated, wherein the outlet nozzle serves as a Venturi nozzle for fluid flow through the nozzle from within the valve chamber, thereby to cause a suction force between the blocking plate and the nozzle that urges the flapper element to its closed position when the blocking plate is seated on the tubular boss, and wherein the width of the flapper element is reduced away from the one end thereof.

11. A normally closed flapper valve according to claim 10, wherein the flapper element is triangular so that bending stress per unit area is constant for any point along the whole length of the flapper element.

12. A normally closed flapper valve in combination with a valve casing defining a valve chamber with an outlet nozzle extending from the valve chamber to outside of the valve casing and having an upstream end formed by a tubular boss extending into the valve chamber, and a piezoelectric flapper element mounted at one end in the valve casing as a cantilever extending into the valve chamber, the flapper element being operable to bend and to interact with fluid flow through the outlet nozzle to modulate fluid flow through the nozzle when an electrical potential is applied to the flapper element, wherein the flapper element carries a blocking plate of a resiliently deformable material adapted, upon bending of the flapper element, to be seated on the tubular boss, thereby to shut off fluid flow from within the valve chamber through the outlet nozzle, wherein a surface of the blocking plate that seats upon the tubular boss has an area substantially greater than a total area at the upstream end of the outlet nozzle defined by an area of a mouth of the outlet nozzle and an area of an end surface of the tubular boss that surrounds the mouth, the resiliently deformable material being such that when the blocking plate is seated on the tubular boss, the tubular boss makes an indentation in the resiliently deformable material and the material of the blocking plate thereby closely conforms around the end surface of the tubular boss, whereby the tubular boss and the resiliently deformable material of the blocking plate interact to form a repeatable "bite" seal when the blocking plate is seated, wherein the tubular boss has an outer surface which tapers to a fine tip at the upstream end of the outlet nozzle, and wherein the width of the flapper element is reduced away from the one end thereof.

13. A normally closed flapper valve according to claim 12, wherein the flapper element is triangular so that bending stress per unit area is constant for any point along the whole length of the flapper element.

14. A normally closed flapper valve according to claim 11 or claim 13, wherein the flapper element tapers to a tip at which said blocking plate is carried.

* * * * *

UNITED STATES PATENT AND TRADEMARK OFFICE
CERTIFICATE OF CORRECTION

PATENT NO. : 6,017,016
DATED : January 25, 2000
INVENTOR(S) : Phillip Richard Jackson Page 1 of 1

It is certified that error appears in the above-identified patent and that said Letters Patent is hereby corrected as shown below:

Claim 1, Column 6,
Line 37, "bossy" should read --boss,--.

Claim 6, Column 7,
Line 10, after "through the", insert --nozzle when an electrical potential is applied to the flapper element, wherein the flapper--.

Signed and Sealed this

Tenth Day of July, 2001

Attest:

*Nicholas P. Godici*

NICHOLAS P. GODICI
*Acting Director of the United States Patent and Trademark Office*

*Attesting Officer*